United States Patent
Guo

(10) Patent No.: US 12,543,162 B2
(45) Date of Patent: Feb. 3, 2026

(54) BEAM SCANNING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Shengxiang Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 338 days.

(21) Appl. No.: 18/271,396

(22) PCT Filed: Jan. 7, 2021

(86) PCT No.: PCT/CN2021/070706
§ 371 (c)(1),
(2) Date: Jul. 7, 2023

(87) PCT Pub. No.: WO2022/147726
PCT Pub. Date: Jul. 14, 2022

(65) Prior Publication Data
US 2024/0089942 A1    Mar. 14, 2024

(51) Int. Cl.
*H04W 72/044* (2023.01)
*H04W 8/24* (2009.01)
*H04W 72/51* (2023.01)

(52) U.S. Cl.
CPC .......... *H04W 72/046* (2013.01); *H04W 8/24* (2013.01); *H04W 72/51* (2023.01)

(58) Field of Classification Search
CPC ..... H04W 72/046; H04W 8/24; H04W 72/51; H04B 7/0628; H04B 7/088; H04B 7/06952
See application file for complete search history.

(56) References Cited

U.S. PATENT DOCUMENTS

| | | | |
|---|---|---|---|
| 11,064,492 B2* | 7/2021 | Shi | H04W 24/10 |
| 2007/0142074 A1* | 6/2007 | Black | H04B 7/0404 |
| | | | 455/562.1 |
| 2013/0237218 A1* | 9/2013 | Li | H04W 36/30 |
| | | | 455/434 |
| 2016/0119910 A1* | 4/2016 | Krzymien | H04B 7/0695 |
| | | | 370/329 |
| 2017/0142605 A1* | 5/2017 | Cheng | H04B 7/0634 |
| 2018/0191417 A1* | 7/2018 | Kim | H04B 7/0695 |
| 2018/0279213 A1* | 9/2018 | Raghavan | H04B 7/0617 |

(Continued)

FOREIGN PATENT DOCUMENTS

CN    110168957 A    8/2019

OTHER PUBLICATIONS

European Patent Application No. 21916784.8, Search and Opinion dated Feb. 16, 2024, 11 pages.

(Continued)

*Primary Examiner* — Ivan O Latorre
(74) *Attorney, Agent, or Firm* — Cozen O'Connor

(57) ABSTRACT

A beam scanning method, performed by a terminal. The method includes receiving resource configuration information that is sent by a base station according to a beam splitting capability supported by the terminal. The resource configuration information is configured for the terminal to determine resources for beam scanning using a beam formed by beam splitting.

15 Claims, 9 Drawing Sheets

(56) References Cited

U.S. PATENT DOCUMENTS

| | | | | |
|---|---|---|---|---|
| 2018/0324678 A1* | 11/2018 | Chen | ......................... | H04W 8/08 |
| 2019/0280784 A1* | 9/2019 | Kwak | .................. | H04W 72/046 |
| 2019/0327669 A1* | 10/2019 | Liu | ...................... | H04B 7/0695 |
| 2019/0335429 A1* | 10/2019 | Takeda | .................. | H04W 16/28 |
| 2019/0394634 A1* | 12/2019 | Akkarakaran | ........ | H04W 88/06 |
| 2020/0244331 A1* | 7/2020 | Karri | .................... | H04B 7/0417 |
| 2020/0413267 A1* | 12/2020 | Xue | ....................... | H04W 24/08 |
| 2021/0266058 A1* | 8/2021 | Yu | .......................... | H04B 7/088 |
| 2022/0217705 A1* | 7/2022 | Zhou | ....................... | H04L 5/001 |
| 2022/0283259 A1* | 9/2022 | Tao | ........................ | G01S 5/0036 |
| 2023/0155658 A1* | 5/2023 | Zhang | ..................... | H04W 8/24 |
| | | | | 455/101 |
| 2023/0156489 A1* | 5/2023 | Qiao | .................. | H04B 7/18513 |
| | | | | 370/329 |
| 2024/0089942 A1* | 3/2024 | Guo | ......................... | H04W 8/24 |
| 2025/0202646 A1* | 6/2025 | Frank | .................... | H04L 5/0048 |

OTHER PUBLICATIONS

Chinese Patent Application No. 202180000194.3, Office Action with English translation dated Feb. 21, 2025, 19 pages.

* cited by examiner center frequency point

BEAM SCANNING METHOD AND APPARATUS, COMMUNICATION DEVICE, AND STORAGE MEDIUM

CROSS-REFERENCE TO RELATED APPLICATIONS

The present application is a national phase entry under 35 USC § 371 of International Application PCT/CN2021/070706, filed Jan. 7, 2021, the entire contents of which are incorporated herein by reference.

TECHNICAL FIELD

The present disclosure relates to, but is not limited to, a field of communication technology, and more particularly to a beam scanning method, a beam scanning apparatus, a communication device, and a storage medium.

BACKGROUND

With the development of mobile communication technology, high-frequency communication has increasingly become a trend in the development of wireless communication technology in order to meet high rate requirements. For example, millimeter waves are introduced into the new radio (NR) of the fifth generation mobile communication technology, and the terahertz frequency band will be widely used in the mobile communication technology.

In high-frequency communication, especially in the terahertz frequency band, there is a phenomenon of beam splitting. The reason for the beam splitting phenomenon is that the antenna module is designed based on a center frequency point, and the bandwidth supported by the terahertz communication usually reaches several GHz or even tens of GHz. Therefore, due to phase changes of a frequency far from the center frequency point, a beam direction corresponding to the frequency deviates from a beam corresponding to the center frequency point, resulting in the beam splitting phenomenon.

SUMMARY

Embodiments of the present disclosure provide a beam scanning method, a beam scanning apparatus, a communication device and a storage medium.

According to a first aspect of the present disclosure, a beam scanning method is provided, which is performed by a terminal and includes receiving resource configuration information that is sent by a base station according to a beam splitting capability supported by the terminal. The resource configuration information is configured for the terminal to determine resources for beam scanning using a beam formed by beam splitting.

According to a second aspect of the present disclosure, a beam scanning method is provided, which is performed by a base station and includes sending resource configuration information to a terminal according to a beam splitting capability supported by the terminal. The resource configuration information is configured for the terminal to determine resources for beam scanning using a beam formed by beam splitting.

According to a third aspect of the present disclosure, a communication device is provided, and the communication device includes a processor; and a memory for storing instructions executable by the processor. The processor is configured to implement the method according to any one of embodiments of the present disclosure.

DETAILED DESCRIPTION

Figure 1:
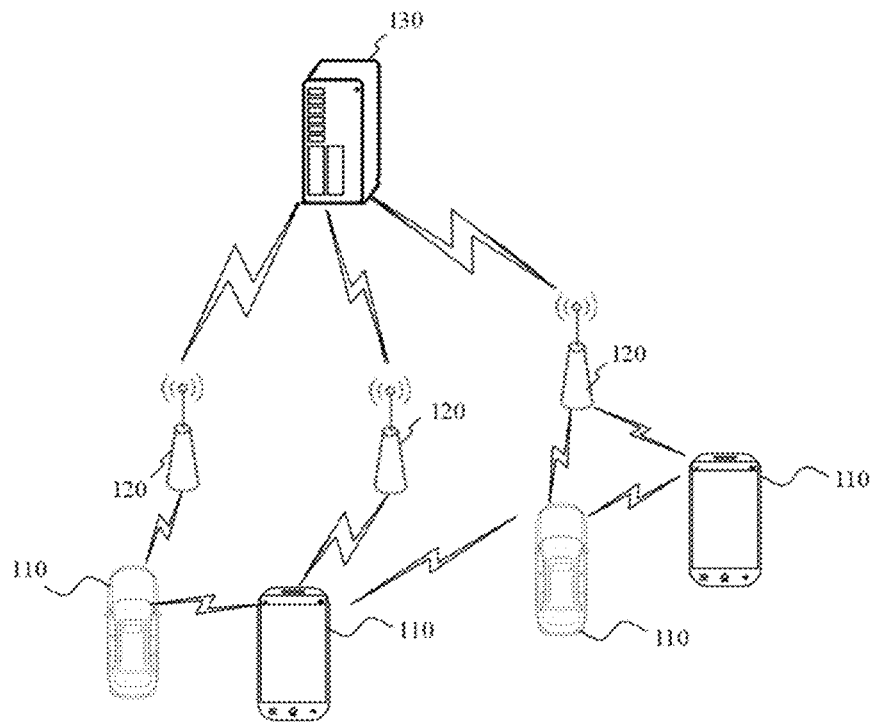
FIG. 1 is a schematic diagram illustrating a wireless communication system.

Embodiments of the present disclosure are described in detail below, examples of which are illustrated in the drawings. When the following the accompanying drawings are described, the same or similar elements are denoted by same reference numerals in different drawings unless indicated otherwise. Implementations described in the following embodiments do not represent all implementations that are consistent with embodiments of the present disclosure. On the contrary, they are only examples of devices and methods that are consistent with some aspects of the embodiments of the present disclosure as detailed in the attached claims.

Terms used in embodiments of the present disclosure are for the purpose of describing specific embodiments only, and are not intended to limit embodiments of the present disclosure. As used in the examples of the present disclosure and the appended claims, the singular forms "a" and "the" are also intended to include the plural unless the context clearly dictates otherwise. It should also be understood that the term "and/or" as used herein refers to and includes any and all possible combinations of one or more of the associated listed items.

It is understood that although embodiments of the present disclosure may use the terms first, second, third, etc. to describe various information, the information should not be limited to these terms. These terms are only used to distinguish information of the same type from one another. For example, without departing from the scope of embodiments of the present disclosure, first information may also be called second information, and similarly, second information may also be called first information. Depending on the context, the word "if" as used herein may be interpreted as "upon" or "when" or "in response to determining".

These terms are only used to distinguish information of the same type from one another. For example, without departing from the scope of embodiments of the present disclosure, first information may also be called second information, and similarly, the second information may also be called the first information.

For the purpose of brevity and ease of understanding, the term "greater than" or "less than" is used herein when characterizing a size relationship. However, those skilled in the art may understand that the term "greater than" also covers the meaning of "greater than or equal to", and "less than" also covers the meaning of "less than or equal to".

Refer to FIG. 1, which shows a schematic diagram of a wireless communication system according to one embodiment of the present disclosure. As shown in FIG. 1, the wireless communication system is a communication system based on a mobile communication technology, and the wireless communication system may include several user equipments 110 and several base stations 120.

The user equipment 110 may be a device that provides voice and/or data connectivity to the user. The user equipment 110 may communicate with one or more core networks via a radio access network (RAN), and the user equipment 110 may be user equipment of an Internet of Things (IoT), such as a sensor device, a mobile phone (or called a cellular phone) and computers with IoT user equipment. For example, the user equipment 110 may be fixed, portable, pocket, hand-held, computer built-in or vehicle-mounted devices. For example, the user equipment 110 may be a station (STA), a subscriber unit, a subscriber station, a mobile station, a mobile, a remote station, an access point, a remote terminal, an access terminal, a user terminal, a user agent, a user device, or a user equipment. Alternatively, the user equipment 110 may also be equipment of an unmanned aerial vehicle. Alternatively, the user equipment 110 may also be a vehicle-mounted device, for example, a trip computer with a wireless communication function, or a wireless user device connected externally to the trip computer. Alternatively, the user equipment 110 may also be a roadside device, for example, may be a street lamp, a signal lamp, or other roadside devices with a wireless communication function.

The base station 120 may be a network side device in a wireless communication system. The wireless communication system may be a fourth generation mobile communication technology (the $4^{th}$ generation mobile communication, 4G) system, also known as a long term evolution (LTE) system. Alternatively, the wireless communication system may also be a 5G system, also known as a new radio system or a 5G NR system. Alternatively, the wireless communication system may also be a next-generation system of the 5G system. The access network in the 5G system may be called a new generation-radio access network (NG-RAN).

The base station 120 may be an evolved base station (eNB) adopted in a 4G system. Alternatively, the base station 120 may also be a base station (gNB) adopting a centralized distributed architecture in the 5G system. When the base station 120 adopts a centralized distributed architecture, it generally includes a central unit (CU) and at least two distributed units (DU). The central unit is provided with a packet data convergence protocol (PDCP) layer, a radio link control (RLC) layer, a media access control (MAC) layer protocol stack. The central unit is provided with a physical (PHY) layer protocol stack, and the specific implementation manner of the base station 120 is not limited in embodiments of the present disclosure.

A wireless connection may be established between the base station 120 and the user equipment 110 through a wireless air interface. In different embodiments, the wireless air interface is a wireless air interface based on the fourth-generation mobile communication network technology (4G) standard. Alternatively, the wireless air interface is a wireless air interface based on the fifth-generation mobile communication network technology (5G) standard, such as a new radio. Alternatively, the wireless air interface may also be a wireless air interface based on a technical standard of a next-generation mobile communication network based on 5G.

In some embodiments, an E2E (End to End) connection may also be established between user equipments 110, such as, V2V (vehicle to vehicle) communication, V2I (vehicle to Infrastructure) communication and V2P (vehicle to pedestrian) communication in V2X (vehicle to everything) communication.

Here, the above-mentioned user equipment may be regarded as the terminal equipment in the following embodiments.

In some embodiments, the above-mentioned wireless communication system may further include a network management device 130.

Several base stations 120 are connected to the network management device 130 respectively. The network management device 130 may be a core network device in a wireless communication system, for example, the network management device 130 may be a mobility management entity (MIME). Alternatively, the network management device may also be other core network devices, such as a serving gateway (SGW), a public data network gateway (PGW), a policy and charging rule function (PCRF) or a home subscriber server (HSS), etc. The implementation form of the network management device 130 is not limited in embodiments of the present disclosure.

In order to facilitate the understanding of those skilled in the art, embodiments of the present disclosure list a plurality of implementation manners to clearly illustrate the technical solutions of embodiments of the present disclosure. Of course, those skilled in the art are understand that embodiments provided by the present disclosure may be executed independently, or combined with methods of other embodiments in the present disclosure, and may also be executed alone or in combination after they are executed together with some methods in other related technologies, which is not limited in the embodiment of the present disclosure.

In order to better understand the technical solution described in any embodiment of the present disclosure, first, a scenario of wireless communication is described through one embodiment.

Figure 2:
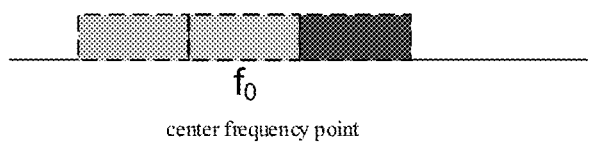
FIG. 2 is a schematic diagram illustrating a center frequency point according to an illustrative embodiment.

In one embodiment, referring to FIG. 2, an antenna module is designed based on a center frequency point $f_0$. In terahertz communication, the supported bandwidth generally reaches several GHz or even tens of GHz. In this way, in terahertz communication, due to the phase change of the frequency far away from the center frequency point, the beam direction corresponding to the frequency will deviate from a beam corresponding to the center frequency point, so the beam splitting phenomenon will occur.

Figure 3:
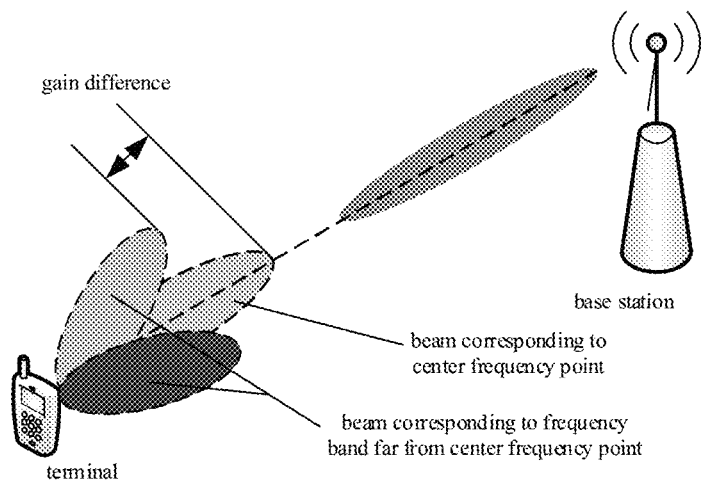
FIG. 3 is a schematic diagram illustrating beam splitting according to an illustrative embodiment.

Here, referring to FIG. 3, the beam splitting phenomenon will cause the gain of the beam in the frequency band far away from the center frequency point to decrease, thereby causing the performance of the entire system to decrease. Therefore, there is a need to reduce the beam splitting phenomena.

In one embodiment, an additional phase delay is introduced, so that the beam splitting phenomenon is reduced, or the split beam is adjusted to a desired direction. However, the beam splitting phenomenon may also bring certain benefits. For example, during the beam scanning process, the beam formed by beam splitting may be used for scanning to improve the efficiency of beam scanning.

Figure 4:
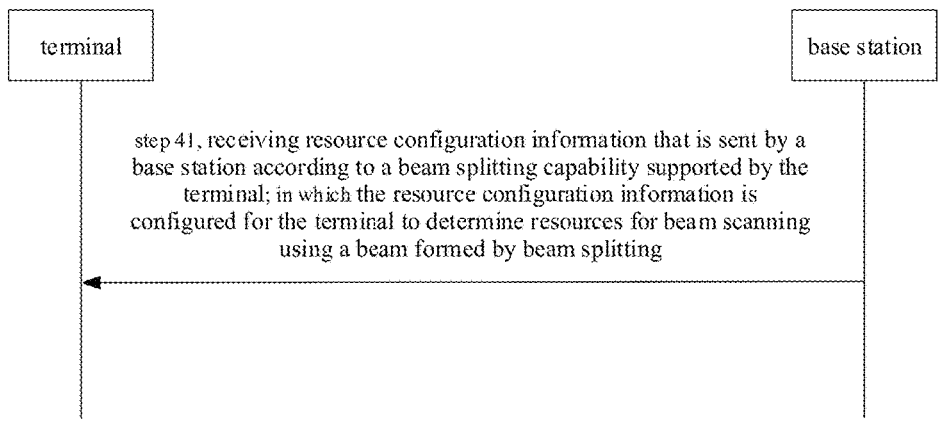
FIG. 4 is a flowchart illustrating a beam scanning method according to an illustrative embodiment.

As shown in FIG. 4, a beam scanning method is provided in embodiments of the present disclosure, which is performed by a terminal. The method includes the following steps.

In step 41, resource configuration information that is sent by a base station according to a beam splitting capability supported by the terminal is received.

The resource configuration information is configured for the terminal to determine resources for beam scanning using a beam formed by beam splitting.

The terminal herein may be, but is not limited to, a mobile phone, a wearable device, a vehicle terminal, a road side unit (RSU), a smart home terminal, an industrial sensor device, or the like.

The base station herein may be an access device for the terminal to access the network. The base station may be various types of base stations. For example, the base station is a base station of a third generation mobile communication (3G) network, a base station of a fourth generation mobile communication (4G) network, a base station of a fifth generation mobile communication (5G) network or a base station of any generation communication system.

In one embodiment, the resource configuration information is configured for the terminal to determine resources for beam scanning in a neighboring cell by using the beam formed by beam splitting. The neighboring cell is a cell adjacent to a serving cell.

In a scenario embodiment, when the terminal performs wireless communication in the serving cell, it will scan a neighboring cell to obtain the wireless channel quality of the signal on the beam of the neighboring cell. After the measurement result of the wireless channel quality is obtained, the terminal will send the measurement result to the base station. In this way, in response to the wireless channel quality of the serving cell being lower than a quality threshold, cell switching may be performed based on the wireless channel quality of the neighboring cell.

In another scenario embodiment, the base station uses beams of different directions to transmit wireless signals. The terminal measures the quality of the wireless channel transmitted by the base station using beams of different directions on the beams of different directions. The terminal reports measurement information to the base station after the measurement result of the wireless channel quality is obtained. The base station determines a transmit beam for data transmission according to the reported information. Beam scanning of the neighboring cell may be measuring wireless signals sent by the base station using beams.

In one embodiment, the resource configuration information is configured for the terminal to determine resources for beam scanning in a neighboring beam using the beam formed by beam splitting. The neighboring beam is a beam adjacent to a serving beam.

In a scenario embodiment, the serving base station sends a plurality of beams. The beam for wireless communication between the serving base station and the terminal is a serving beam. A beam in the plurality of beams adjacent to the serving beam is a neighboring beam of the serving beam. The configured resource indicates the resource for beam scanning in the neighboring beam of the serving beam using the beam formed by beam splitting.

In a scenario embodiment, when the terminal is wirelessly communicated with the base station via the serving beam, the terminal scans the wireless channel quality of the neighboring beam. After the measurement result of the wireless channel quality is obtained, the terminal sends the measurement result to the base station. In this way, in response to the wireless channel quality of the serving beam being less than the quality threshold, cell switching may be performed based on the wireless channel quality of the neighboring beam.

The wireless channel quality herein may include at least one of the following: reference signal received power (RSRP) and reference signal received quality (RSRQ).

In one embodiment, the terminal may perform beam scanning on each of a plurality of beams formed by beam splitting to obtain a measurement result on each beam. The base station may configure different resources for different beams. That is, the resource configuration information indicates resources for different beams formed by beam splitting. For example, the beams formed by beam splitting include beam 1, beam 2, and beam 3, and the configured resources are resource 1, resource 2, and resource 3 respectively. The terminal may use beam 1, beam 2, and beam 3 on the corresponding resources to perform signal measurements to obtain the measurement result on each beam. After the beam scanning is completed, the terminal will send the scanning result obtained by scanning on each beam to the base station.

In one embodiment, the terminal sends capability information to the base station. The capability information indicates the beam splitting capability supported by the terminal. In response to the base station receiving the capability information and the capability information indicating that the terminal supports the beam splitting capability, the base station sends the resource configuration information to the terminal according to the capability information. The terminal receives the resource configuration information, and the terminal performs beam scanning on resources indicated by the resource configuration information using the beam formed by beam splitting.

In one embodiment, the terminal sends capability information to the base station. The capability information indicates the beam splitting capability supported by the terminal. In response to the base station receiving the capability information and the capability information indicating that the terminal does not support the beam splitting capability, the base station does not send the resource configuration information. At this time, the terminal may perform beam scanning based on a predetermined resource configuration.

In one embodiment, in response to establishing a radio resource control (RRC) connection between the terminal and the base station, the terminal sends capability information to the base station. The capability information herein at least indicates the capability of the terminal to support or not support beam splitting.

In one embodiment, the capability information includes at least one of the following.

First information indicates a capability of the terminal to support or not support beam splitting.

Second information indicates a spectral bandwidth of an effective beam formed by beam splitting. A difference between a gain of the effective beam and a gain of a center beam is less than or equal to a gain threshold. The center beam is a beam corresponding to a center frequency point of beam splitting.

Third information indicates the number of the effective beams.

Fourth information indicates a frequency-domain positional relationship between the effective beam and the center beam.

In one embodiment, in response to the beam of the terminal being capable of undergoing beam splitting, the first information indicates the capability of the terminal to support beam splitting. In response to the beam of the terminal being not capable of undergoing beam splitting, the first information indicates that the terminal does not support the capability of beam splitting. In this way, after the capability information is received, the base station may allocate resources to terminals supporting beam splitting. Here, resources may be allocated to each of the plurality of beams of the terminal which are formed by beam splitting. In this way, the terminal may use a plurality of beams formed by beam splitting to perform beam scanning on the allocated corresponding resources.

In one embodiment, the beams formed by beam splitting include a plurality of beams. The plurality of beams includes effective beams and invalid beams. In one embodiment, a difference between a gain of the effective beam and a gain of the center beam is less than or equal to a gain threshold, and a difference between a gain of the invalid beam and the gain of the center beam is greater than the gain threshold. In another embodiment, the gain of the effective beam is greater than the gain threshold, and the gain of the invalid beam is less than the gain threshold.

In one embodiment, the gain of the beam is a parameter associated with a transmit power of the beam. In one embodiment, in response to the transmit power of the beam being greater than a power threshold, the gain of the beam is greater than the gain threshold. In response to the transmit power of the beam being less than the power threshold, the gain of the beam is less than the gain threshold.

In one embodiment, in response to scanning wireless signals with the same signal strength and a gain of a first effective beam being greater than a gain of a second effective beam, a signal strength of a wireless signal scanned on the first effective beam is greater than a signal strength of a wireless signal scanned on the second effective beam. Here, the first effective beam and the second effective beam are beams formed by beam splitting.

In one embodiment, in response to the number of effective beams being greater than a number threshold, a spectral bandwidth occupied by the effective beams formed by beam splitting is greater than a bandwidth threshold. In response to the number of effective beams being less than the number threshold, the spectral bandwidth occupied by the effective beams formed by beam splitting is less than the bandwidth threshold. The base station configures resources for each effective beam corresponding to the number. Here, the spectral bandwidth occupied by the effective beams may be the spectral bandwidth occupied by all effective beams formed by beam splitting.

In one embodiment, the beams include a beam corresponding to a center frequency point position and a beam corresponding to an edge position. The gain of the beam corresponding to the center frequency point is greater than the gain of the beam corresponding to the edge position.

In one embodiment, the effective beams formed by beam splitting include a plurality of beams. A relative frequency-domain positional relationship between each effective beam and the center beam is different.

In one embodiment, the base station determines the beam splitting capability of the terminal according to a type of the terminal. In response to the base station receiving the capability information and the capability information indicating that the terminal supports the beam splitting capability, the base station sends resource configuration information to the terminal according to the beam splitting capability; the terminal receives the resource configuration information; and the terminal performs beam scanning on resources indicated by the resource configuration information using the beam formed by beam splitting.

In one embodiment, the types of the terminal include a first type supporting beam splitting and a second type not supporting beam splitting. In one embodiment, in response to the type of the terminal being the first type, it is determined that the terminal supports beam splitting. In response to the type of the terminal being the second type, it is determined that the terminal does not support beam splitting.

The resource configuration information herein may indicate time domain and/or frequency domain resources for beam scanning. In one embodiment, different time domain resources and/or frequency domain resources are configured for different beams formed by beam splitting.

In one embodiment, the resource configuration information that is sent by the base station according to the beam splitting capability of the terminal is received. The resource configuration information is configured for the terminal to determine resources for beam scanning using the effective beam formed by beam splitting. Here, the difference between the gain of the effective beam and the gain of the center beam is less than or equal to the gain threshold. Here, the center beam is the beam corresponding to the center frequency point of beam splitting.

In embodiments of the present disclosure, the resource configuration information that is sent by the base station according to the beam splitting capability of the terminal is received. The resource configuration information is configured for the terminal to determine resources for beam scanning using the beam formed by beam splitting. In this way, on the one hand, since the base station sends the resource configuration information based on the beam splitting capability of the terminal, the resource configuration may be adapted to the capability of the terminal. On the other hand, the terminal may use the beam formed by beam splitting to perform beam scanning on the resources indicated by the resource configuration information. Since the terminal herein may use a plurality of beams formed by beam splitting to perform beam scanning, compared to the method where the terminal only uses a single beam for beam scanning in a neighboring cell, the efficiency of beam scanning by the terminal will be improved.

It is noted that those skilled in the art may understand that the methods provided in embodiments of the present disclosure may be executed independently, or together with some methods in embodiments of the present disclosure or some methods in related technologies.

Figure 5:
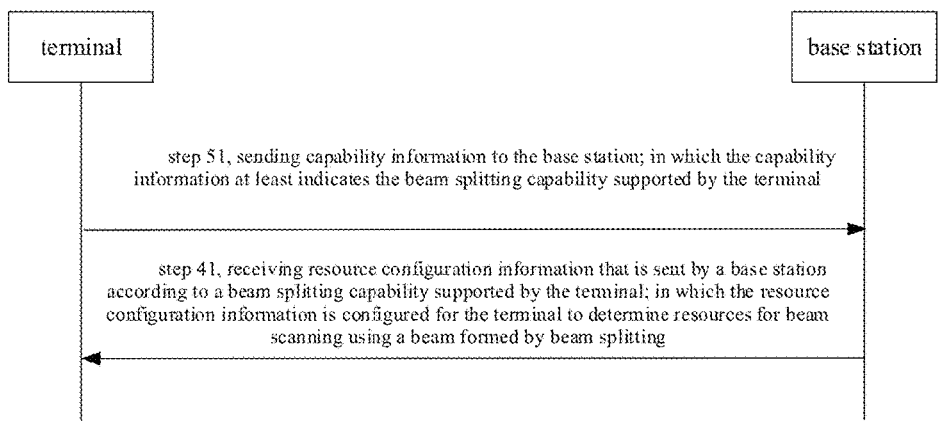
FIG. 5 is a flowchart illustrating a beam scanning method according to an illustrative embodiment.

As shown in FIG. 5, a beam scanning method is provided in embodiments of the present disclosure, which is performed by a terminal. The method includes the following steps.

In step 51, capability information is sent to a base station.

The capability information at least indicates the beam splitting capability supported by the terminal.

In one embodiment, the terminal may send the capability information to the base station in at least one of the following ways.

The terminal sends the capability information to the base station through a random access message in a random access process.

The terminal sends the capability information to the terminal through an RRC message.

In this way, signaling compatibility may be improved by sending the capability information through the random access message and/or the RRC message.

In one embodiment, the terminal may send the capability information to the base station in at least one of the following occasions.

In response to establishing the RRC connection, the capability information is sent to the base station using an RRC message.

In response to starting random access, the capability information is sent to the base station using a first message MSG1.

In response to receiving request information for acquiring capability information sent by the base station, the capability information is sent to the base station.

In one embodiment, in response to the terminal being capable of performing beam splitting, it is indicated that the terminal supports the capability of beam splitting. In response to the terminal being unable to perform beam splitting, it is indicated that the terminal does not support the capability of beam splitting.

In one embodiment, the information field of the capability information may indicate the beam splitting capability of the terminal. For example, in response to the information field of the capability information carrying "0", it indicates that the terminal does not support the beam splitting capability; in response to the information field of the capability information carrying "1", it indicates that the terminal does not support the beam splitting capability.

In one embodiment, the capability information includes at least one of the following.

First information indicates a capability of the terminal to support or not support beam splitting.

Second information indicates a spectral bandwidth of an effective beam formed by beam splitting. A difference between a gain of the effective beam and a gain of a center beam is less than or equal to a gain threshold. The center beam is a beam corresponding to a center frequency point of beam splitting.

Third information indicates the number of the effective beams.

Fourth information indicates a frequency-domain positional relationship between the effective beam and the center beam.

It is noted that those skilled in the art may understand that the methods provided in embodiments of the present disclosure may be executed independently, or together with some methods in embodiments of the present disclosure or some methods in the related art.

Figure 6:
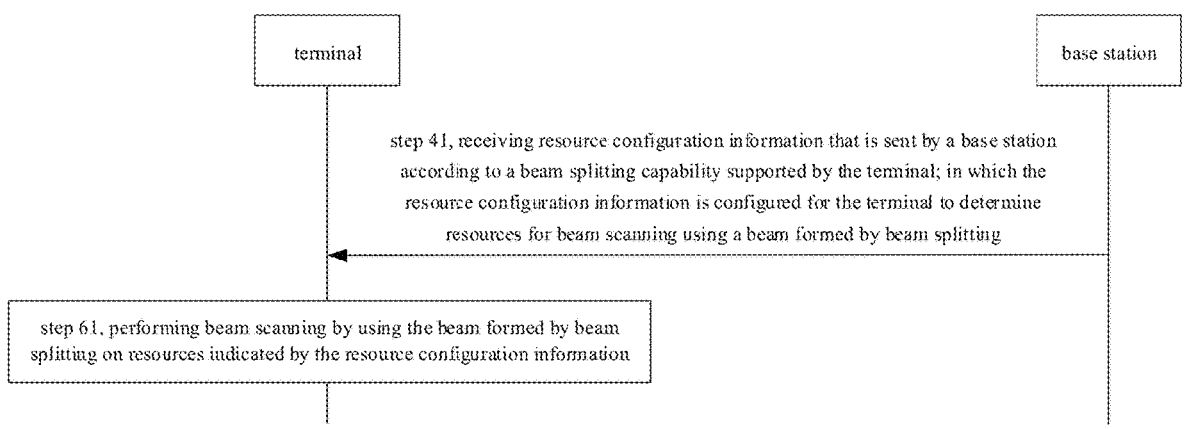
FIG. 6 is a flowchart illustrating a beam scanning method according to an illustrative embodiment.

As shown in FIG. 6, embodiments of the present disclosure provide a beam scanning method, which is performed by a terminal, and the method includes:

step 61, performing beam scanning by using a beam formed by beam splitting on resources indicated by the resource configuration information.

In one embodiment, on the resources indicated by the resource configuration information, effective beams formed by beam splitting are used to perform beam scanning. There are a plurality of effective beams formed by beam splitting, and the resource configuration information indicates resources for each effective beam. In this way, the terminal may use the corresponding effective beam to perform beam scanning on the corresponding resource indicated by the resource configuration information.

In one embodiment, in response to the service quality of the serving cell where the terminal is located being less than the quality threshold, beam scanning is performed on resources indicated by the resource configuration information using the beam formed by beam splitting. In this way, the terminal may scan a cell whose signal quality meets the quality requirement in time, and perform cell reselection or cell switching in time. Alternatively, the terminal may scan a beam whose signal quality meets the quality requirement in time, and switch the beam in time.

In one embodiment, on the resources indicated by the resource configuration information, the beam formed by beam splitting are periodically used to perform beam scanning. It is noted that there are a plurality of beams formed by beam splitting, and beam scanning may be performed by using the plurality of beams at the same time.

It is noted that those skilled in the art may understand that the methods provided in embodiments of the present disclosure may be executed independently, or together with some methods in embodiments of the present disclosure or some methods in the related art.

Figure 7:
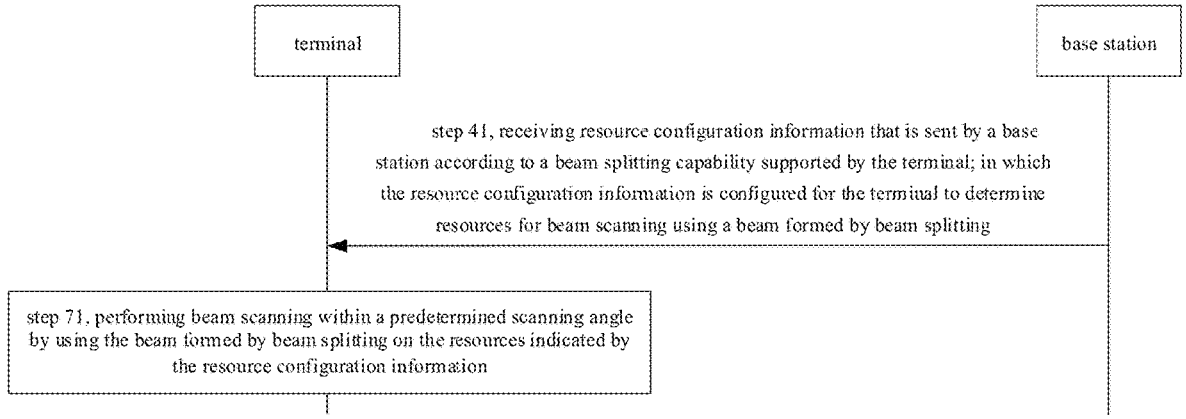
FIG. 7 is a flowchart illustrating a beam scanning method according to an illustrative embodiment.

As shown in FIG. 7, embodiments of the present disclosure provide a beam scanning method, which is performed by a terminal. The method includes:

step 71, on resources indicated by the resource configuration information, performing beam scanning within a predetermined scanning angle using a beam formed by beam splitting.

In one embodiment, the resource configuration information indicates a time unit for performing beam scanning within a predetermined scanning angle using the beam formed beam splitting. Here, the time unit may be a time slot. For example, in a first time slot indicated by the resource configuration information, the terminal uses the beam formed by beam splitting to perform beam scanning within a first predetermined scanning angle. In a second time slot indicated by the resource configuration information, the terminal uses the beam formed by beam splitting to perform beam scanning within a second predetermined scanning angle.

In one embodiment, on the resources indicated by the resource configuration information, beam scanning is performed within a predetermined scanning angle by using an effective beam formed by beam splitting. In one embodiment, the difference between a gain of the effective beam and a gain of a center beam is less than or equal to a gain threshold, and the difference between a gain of an invalid beam and the gain of the center beam is greater than the gain threshold. In another embodiment, the gain of the effective beam is greater than the gain threshold, and the gain of the invalid beam is less than the gain threshold.

In one embodiment, the predetermined scanning angle is determined according to the number of beams formed by beam splitting. In one embodiment, the predetermined scanning angle is determined to be greater than an angle threshold in response to the number of beams formed by beam splitting being greater than the number threshold; and the predetermined scanning angle is determined to be less than the angle threshold in response to the number of beams formed by beam splitting being less than the number threshold. In this way, the predetermined scanning angle can be adaptively adjusted according to the number of beams formed by beam splitting.

It is noted that those skilled in the art may understand that the methods provided in embodiments of the present disclosure may be executed independently, or together with some methods in embodiments of the present disclosure or some methods in the related art.

Figure 8:
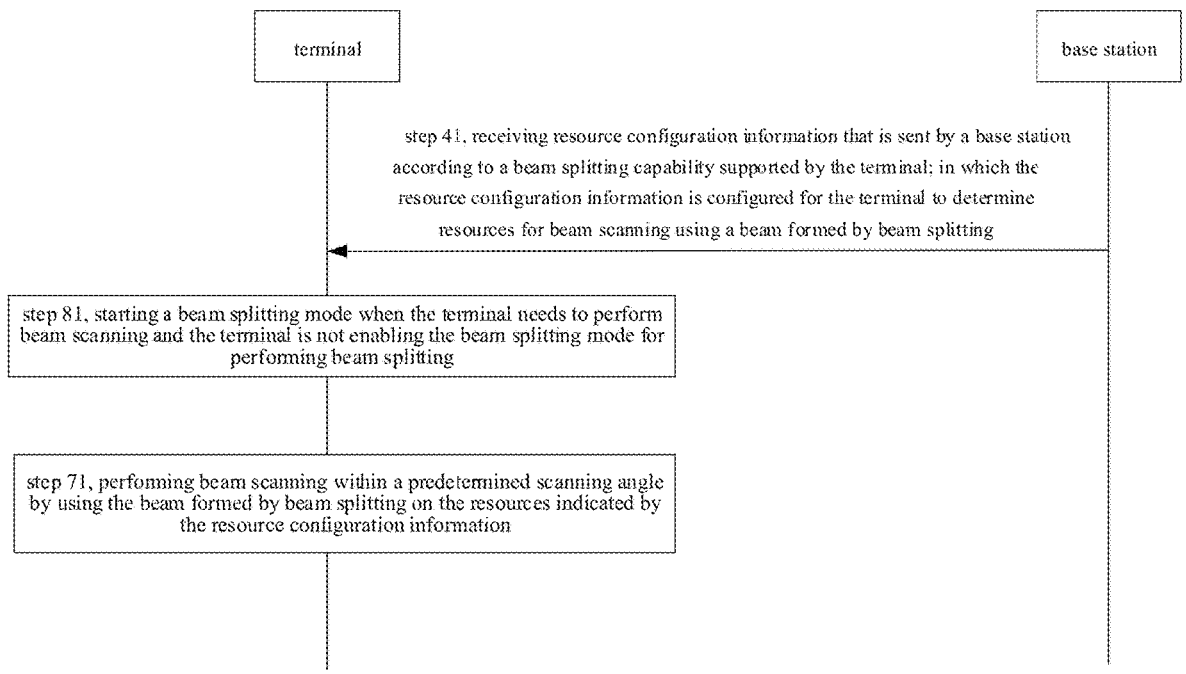
FIG. 8 is a flowchart illustrating a beam scanning method according to an illustrative embodiment.

As shown in FIG. 8, embodiments of the present disclosure provide a beam scanning method, which is performed by a terminal. The method includes:

step 81: starting a beam splitting mode when the terminal needs to perform beam scanning and the terminal not enabling the beam splitting mode for performing beam splitting.

In one embodiment, the terminal is in the beam splitting mode for beam splitting, which may mean that the terminal supports the capability of beam splitting and the beam of the terminal will undergo beam splitting. The terminal does not enable the beam splitting mode for beam splitting, which may mean that the terminal supports the capability of beam splitting but the beam of the terminal does not undergo beam splitting.

In one embodiment, in response to the terminal needing to perform beam scanning and the terminal being in a beam splitting mode for beam splitting, beam scanning is performed within a predetermined scanning angle using the beam formed by beam splitting on resources indicated by the resource configuration.

In another embodiment, in response to the terminal needing to perform beam scanning and the terminal not enabling the beam splitting mode for beam splitting, the beam splitting mode is started. On the resource indicated by the resource configuration information, beam scanning is performed within a predetermined scanning angle using the beam formed by beam splitting.

In one embodiment, the base station instructs the terminal to work in the beam splitting mode or in a non-beam splitting mode. In one embodiment, in response to the base station allocating resources in the beam splitting mode to the terminal, the terminal works in the beam splitting mode. In the beam splitting mode, the terminal may perform beam splitting, and use the beam formed by beam splitting to perform beam scanning.

It is noted that those skilled in the art may understand that the methods provided in embodiments of the present disclosure may be executed independently, or together with some methods in embodiments of the present disclosure or some methods in the related art.

Figure 9:
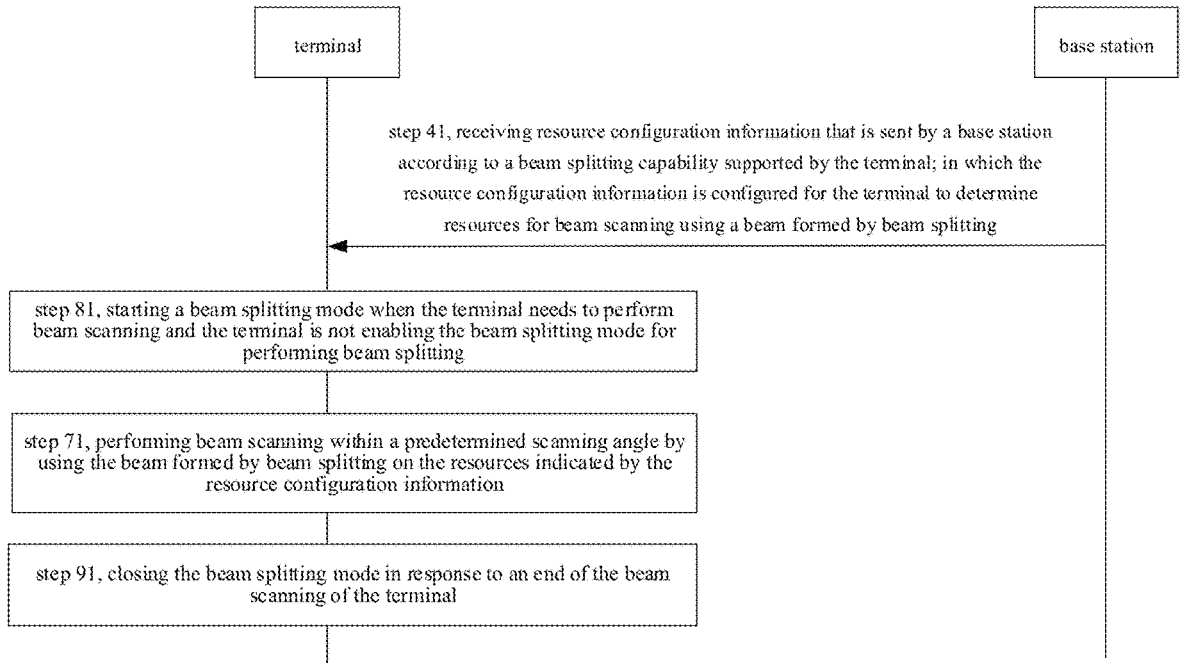
FIG. 9 is a flowchart illustrating a beam scanning method according to an illustrative embodiment.

As shown in FIG. 9, embodiments of the present disclosure provide a beam scanning method, which is performed by a terminal, and the method includes:

step 91, closing the beam splitting mode in response to an end of the beam scanning of the terminal.

In one embodiment, in response to obtaining the scanning result of the neighboring cell, it is determined that the beam scanning of the terminal ends. The scanning result of the neighboring cell may be the signal quality of a sounding signal scanned on the beam formed by beam splitting.

In one embodiment, the beams formed by beam splitting include a plurality of effective beams, and the scanning result of the neighboring cell may be the signal quality of sounding signals scanned on the plurality of effective beams. Corresponding sounding signals will be scanned on different effective beams. In one embodiment, a difference between a gain of an effective beam and a gain of a center beam is less than or equal to a gain threshold, and a difference between a gain of an invalid beam and the gain of the center beam is greater than the gain threshold. In another embodiment, the gain of the effective beam is greater than the gain threshold, and the gain of the invalid beam is less than the gain threshold.

In one embodiment, closing the beam splitting mode may be that the terminal switches from working in the beam splitting mode to working in a non-beam splitting mode. In the non-beam splitting mode, the terminal cannot perform beam splitting.

It is noted that those skilled in the art may understand that the methods provided in embodiments of the present disclosure may be executed independently, or together with some methods in embodiments of the present disclosure or some methods in the related art.

Figure 10:
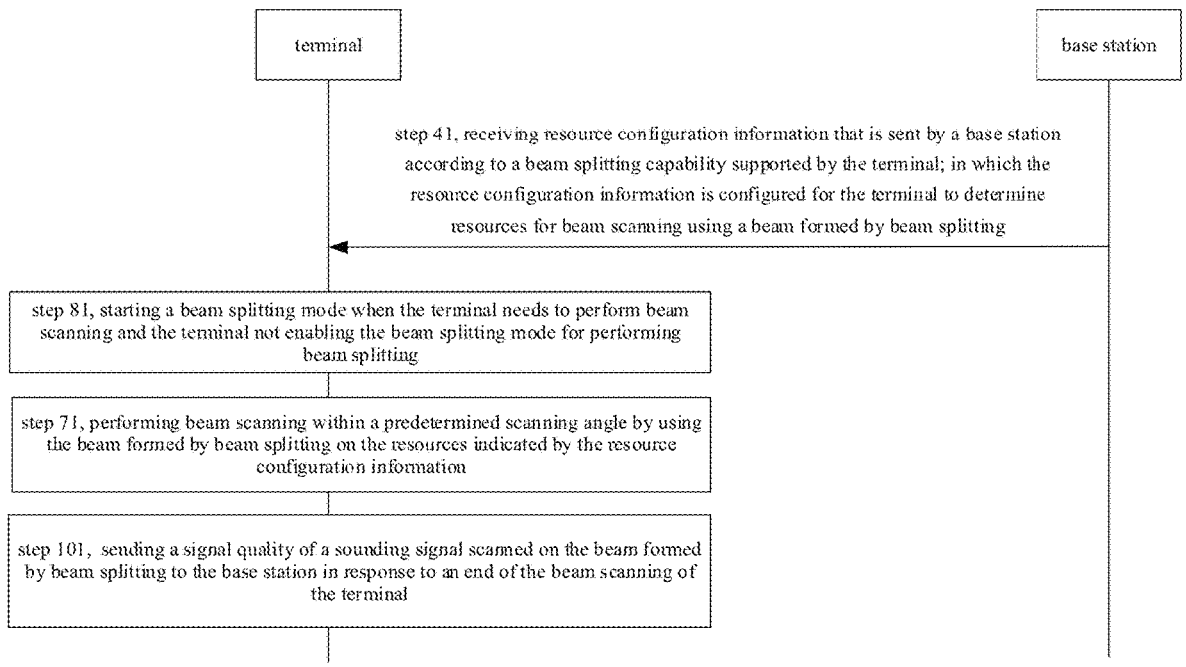
FIG. 10 is a flowchart illustrating a beam scanning method according to an illustrative embodiment.

As shown in FIG. 10, embodiments of the present disclosure provide a beam scanning method, which is performed by a terminal, and the method includes:

step 101: sending a signal quality of a sounding signal scanned on the beam formed by beam splitting to the base station in response to an end of the beam scanning of the terminal.

In one embodiment, in response to the end of the beam scanning of the terminal, the signal quality of the sounding signal scanned on the effective beam formed by beam splitting is sent to the base station. In one embodiment, the difference between the gain of the effective beam and the gain of the center beam is less than or equal to the gain threshold, and the difference between the gain of the invalid beam and the gain of the center beam is greater than the gain threshold. In another embodiment, the gain of the effective beam is greater than the gain threshold, and the gain of the invalid beam is less than the gain threshold.

In one embodiment, the signal quality may include at least one of the following: reference signal received power and reference signal received quality.

In one embodiment, the beams formed by beam splitting include a plurality of effective beams, and the channel quality may be the signal quality of the sounding signals scanned on the plurality of effective beams. Corresponding sounding signals are scanned on different effective beams.

In one embodiment, in response to scanning sounding signals with the same signal strength and the gain of the first effective beam being greater than the gain of the second effective beam, the signal strength of the wireless signal scanned on the first effective beam is greater than the signal strength of the wireless signal scanned on the second effective beam.

It is noted that those skilled in the art may understand that the methods provided in embodiments of the present disclosure may be executed independently, or together with some methods in embodiments of the present disclosure or some methods in the related art.

Figure 11:
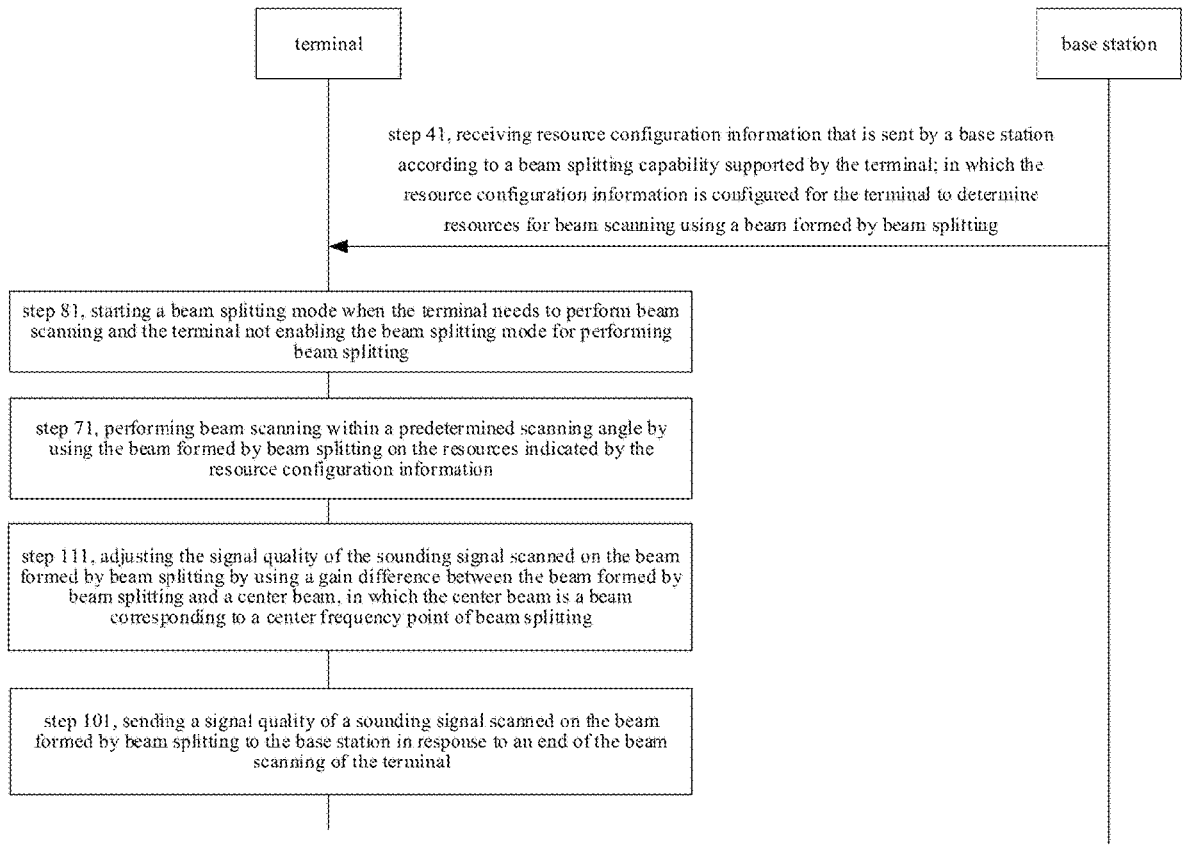
FIG. 11 is a flowchart illustrating a beam scanning method according to an illustrative embodiment.

As shown in FIG. 11, embodiments of the present disclosure provide a beam scanning method, which is performed by a terminal, and the method includes:

step 111, adjusting the signal quality of the sounding signal scanned on the beam formed by beam splitting by using a gain difference between the beam formed by beam splitting and a center beam.

The center beam is a beam corresponding to a center frequency point of beam splitting.

Here, reference is made to the gain difference in FIG. 3.

In one embodiment, in response to scanning sounding signals with the same signal strength and the gain of the first effective beam being greater than the gain of the second effective beam, the signal strength of the wireless signal scanned on the first effective beam is greater than the signal strength of the wireless signal scanned on the second effective beam. Here, the first effective beam and the second effective beam are beams formed by beam splitting. The gain difference between the first effective beam and the center beam is different from the gain difference between the second effective beam and the center beam.

Here, since scanning results of sounding signals with the same signal strength on different effective beams are different, it is required to perform normalization processing on the signal quality of the sounding signals in the scanning results.

In one embodiment, an adjustment value for adjusting the signal quality of the sounding signal may be greater than an adjustment threshold in response to the gain difference between the beam formed by beam splitting and the center beam being greater than a difference threshold. For example, in response to the gain difference between the beam formed by beam splitting and the center beam being smaller than the difference threshold, the adjustment value for adjusting the signal quality of the sounding signal is smaller than the adjustment threshold.

It is noted that those skilled in the art may understand that the methods provided in embodiments of the present disclosure may be executed independently, or together with some methods in embodiments of the present disclosure or some methods in the related art.

Figure 12:
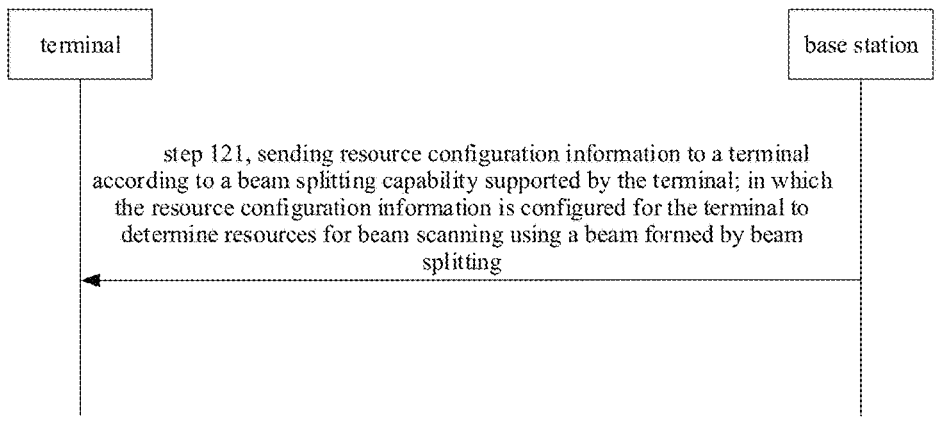
FIG. 12 is a flowchart illustrating a beam scanning method according to an illustrative embodiment.

As shown in FIG. 12, embodiments of the present disclosure provide a beam scanning method, which is performed by a base station, and the method includes:

step 121, sending resource configuration information to a terminal according to a beam splitting capability supported by the terminal.

The resource configuration information is configured for the terminal to determine resources for beam scanning using a beam formed by beam splitting.

The terminal herein may be, but is not limited to, a mobile phone, a wearable device, a vehicle terminal, a road side unit (RSU), a smart home terminal, an industrial sensor device, or the like.

The base station herein may be an access device for the terminal to access the network. The base station may be various types of base stations. For example, the base station is a base station of a third generation mobile communication (3G) network, a base station of a fourth generation mobile communication (4G) network, a base station of a fifth generation mobile communication (5G) network or a base station of any generation communication system.

In one embodiment, the resource configuration information is configured for the terminal to determine resources for beam scanning in a neighboring cell by using the beam formed by beam splitting. The neighboring cell is a cell adjacent to a serving cell.

In a scenario embodiment, when the terminal performs wireless communication in the serving cell, it will scan a neighboring cell to obtain the wireless channel quality of the signal on the beam of the neighboring cell. After the measurement result of the wireless channel quality is obtained, the terminal will send the measurement result to the base station. In this way, in response to the wireless channel quality of the serving cell being lower than a quality threshold, cell switching may be performed based on the wireless channel quality of the neighboring cell.

In another scenario embodiment, the base station uses beams of different directions to transmit wireless signals. The terminal measures the quality of the wireless channel transmitted by the base station using beams of different directions on the beams of different directions. The terminal reports measurement information to the base station after the measurement result of the wireless channel quality is obtained. The base station determines a transmit beam for data transmission according to the reported information. Beam scanning of the neighboring cell may be measuring wireless signals sent by the base station using beams.

In one embodiment, the resource configuration information is configured for the terminal to determine resources for beam scanning in a neighboring beam using the beam formed by beam splitting. The neighboring beam is a beam adjacent to a serving beam.

In a scenario embodiment, the serving base station sends a plurality of beams. The beam for wireless communication between the serving base station and the terminal is a serving beam. A beam in the plurality of beams adjacent to the serving beam is a neighboring beam of the serving beam. The configured resource indicates the resource for beam scanning in the neighboring beam of the serving beam using the beam formed by beam splitting.

In a scenario embodiment, when the terminal is wirelessly communicated with the base station via the serving beam, the terminal scans the wireless channel quality of the neighboring beam. After the measurement result of the wireless channel quality is obtained, the terminal sends the measurement result to the base station. In this way, in response to the wireless channel quality of the serving beam being less than the quality threshold, cell switching may be performed based on the wireless channel quality of the neighboring beam.

The wireless channel quality herein may include at least one of the following: reference signal received power (RSRP) and reference signal received quality (RSRQ).

In one embodiment, the terminal may perform beam scanning on each of a plurality of beams formed by beam splitting to obtain a measurement result on each beam. The base station may configure different resources for different beams. That is, the resource configuration information indicates resources for different beams formed by beam splitting. For example, the beams formed by beam splitting include beam 1, beam 2, and beam 3, and the configured resources are resource 1, resource 2, and resource 3 respectively. The terminal may use beam 1, beam 2, and beam 3 on the corresponding resources to perform signal measurements to obtain the measurement result on each beam. After the beam scanning is completed, the terminal will send the scanning result obtained by scanning on each beam to the base station.

In one embodiment, the base station receives capability information sent by the terminal. The capability information indicates the beam splitting capability supported by the terminal. In response to the base station receiving the capability information and the capability information indicating that the terminal supports the beam splitting capability, the base station sends the resource configuration information to the terminal according to the capability information. The terminal receives the resource configuration information, and the terminal performs beam scanning on resources indicated by the resource configuration information using the beam formed by beam splitting.

In one embodiment, the base station receives capability information sent by the terminal. The capability information indicates the beam splitting capability supported by the terminal. In response to the base station receiving the capability information and the capability information indicating that the terminal does not support the beam splitting capability, the base station does not send the resource configuration information. At this time, the terminal may perform beam scanning based on a predetermined resource configuration.

In one embodiment, in response to establishing a radio resource control (RRC) connection between the terminal and the base station, the terminal sends capability information to the base station. The capability information herein at least indicates the capability of the terminal to support or not support beam splitting.

In one embodiment, the capability information includes at least one of the following.

First information indicates a capability of the terminal to support or not support beam splitting.

Second information indicates a spectral bandwidth of an effective beam formed by beam splitting. A difference between a gain of the effective beam and a gain of a center beam is less than or equal to a gain threshold. The center beam is a beam corresponding to a center frequency point of beam splitting.

Third information indicates the number of the effective beams.

Fourth information indicates a frequency-domain positional relationship between the effective beam and the center beam.

In one embodiment, in response to the beam of the terminal being capable of undergoing beam splitting, the first information indicates the capability of the terminal to support beam splitting. In response to the beam of the terminal being not capable of undergoing beam splitting, the first information indicates that the terminal does not support the capability of beam splitting. In this way, after the capability information is received, the base station may allocate resources to terminals supporting beam splitting. Here, resources may be allocated to each of the plurality of beams of the terminal which are formed by beam splitting. In this way, the terminal may use a plurality of beams formed by beam splitting to perform beam scanning on the allocated corresponding resources.

In one embodiment, the beams formed by beam splitting include a plurality of beams. The plurality of beams includes effective beams and invalid beams. In one embodiment, a difference between a gain of the effective beam and a gain of the center beam is less than or equal to a gain threshold, and a difference between a gain of the invalid beam and the gain of the center beam is greater than the gain threshold. In another embodiment, the gain of the effective beam is greater than the gain threshold, and the gain of the invalid beam is less than the gain threshold.

In one embodiment, the gain of the beam is a parameter associated with a transmit power of the beam. In one embodiment, in response to the transmit power of the beam being greater than a power threshold, the gain of the beam is greater than the gain threshold. In response to the transmit power of the beam being less than the power threshold, the gain of the beam is less than the gain threshold.

In one embodiment, in response to scanning wireless signals with the same signal strength and a gain of a first effective beam being greater than a gain of a second effective beam, a signal strength of a wireless signal scanned on the first effective beam is greater than a signal strength of a wireless signal scanned on the second effective beam. The first effective beam and the second effective beam are beams formed by beam splitting. The gain difference between the first effective beam and the center beam is different from the gain difference between the second effective beam and the center beam.

In one embodiment, in response to the number of effective beams being greater than a number threshold, a spectral bandwidth occupied by the effective beams formed by beam splitting is greater than a bandwidth threshold. In response to the number of effective beams being less than the number threshold, the spectral bandwidth occupied by the effective beams formed by beam splitting is less than the bandwidth threshold. The base station configures resources for each effective beam corresponding to the number. Here, the spectral bandwidth occupied by the effective beams may be the spectral bandwidth occupied by all effective beams formed by beam splitting. In one embodiment, the beams include a beam corresponding to a center frequency point position and a beam corresponding to an edge position. The gain of the beam corresponding to the center frequency point is greater than the gain of the beam corresponding to the edge position.

In one embodiment, the effective beams formed by beam splitting include a plurality of beams. The relative frequency-domain positional relationship between each effective beam and the center beam is different.

In one embodiment, the base station determines the beam splitting capability of the terminal according to a type of the terminal. In response to the base station receiving the capability information and the capability information indicating that the terminal supports the beam splitting capability, the base station sends resource configuration information to the terminal according to the beam splitting capability. The terminal receives the resource configuration information. The terminal performs beam scanning on resources indicated by the resource configuration information using the beam formed by beam splitting. Here, the resource configuration indicates resources for a plurality of beams formed by beam splitting.

In one embodiment, the types of the terminal include a first type supporting beam splitting and a second type not supporting beam splitting. In one embodiment, in response to the type of the terminal being the first type, it is determined that the terminal supports beam splitting. In response to the type of the terminal being the second type, it is determined that the terminal does not support beam splitting.

The resource configuration information herein may indicate time domain and/or frequency domain resources for beam scanning. In one embodiment, different time domain resources and/or frequency domain resources are configured for different beams formed by beam splitting.

In one embodiment, the resource configuration information that is sent by the base station according to the beam splitting capability of the terminal is received. The resource configuration information is configured for the terminal to determine resources for beam scanning using the effective beam formed by beam splitting. Here, the difference between the gain of the effective beam and the gain of the center beam is less than or equal to the gain threshold. Here, the center beam is the beam corresponding to the center frequency point of beam splitting.

In embodiments of the present disclosure, the resource configuration information is sent to the terminal according to the beam splitting capability of the terminal is received. The resource configuration information is configured for the terminal to determine resources for beam scanning using the beam formed by beam splitting. In this way, on the one hand, since the base station sends the resource configuration information based on the beam splitting capability of the terminal, the resource configuration may be adapted to the capability of the terminal. On the other hand, the terminal may use the beam formed by beam splitting to perform beam scanning on the resources indicated by the resource configuration information. Since the terminal herein may use a plurality of beams formed by beam splitting to perform beam scanning, compared to the method where the terminal only uses a single beam for beam scanning in a neighboring cell, the efficiency of beam scanning by the terminal will be improved.

It is noted that those skilled in the art may understand that the methods provided in embodiments of the present disclosure may be executed independently, or together with some methods in embodiments of the present disclosure or some methods in the related art.

Figure 13:
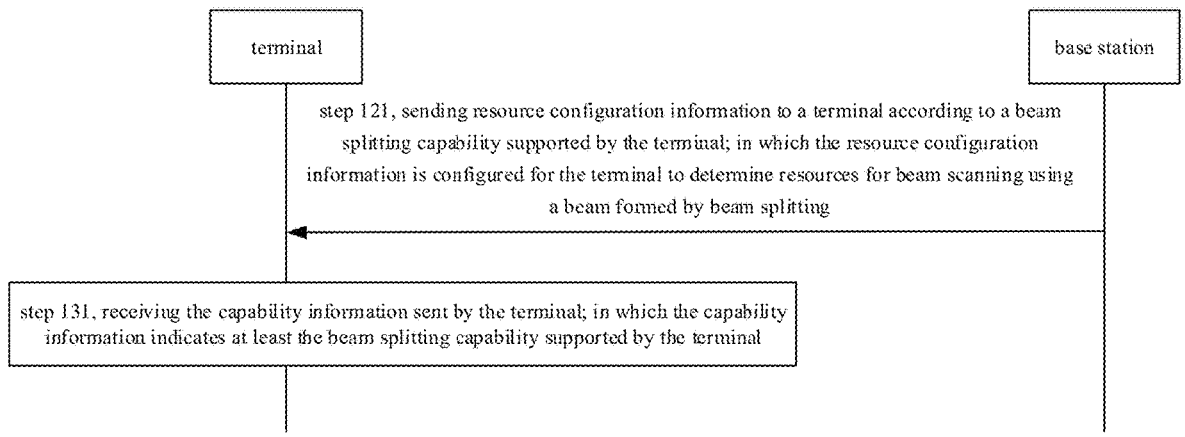
FIG. 13 is a flowchart illustrating a beam scanning method according to an illustrative embodiment.

As shown in FIG. 13, embodiments of the present disclosure provide a beam scanning method, which is performed by a base station, and the method includes:

step 131, receiving capability information sent by the terminal.

The capability information at least indicates the beam splitting capability supported by the terminal.

In one embodiment, the terminal may send the capability information to the base station in at least one of the following ways.

The terminal sends the capability information to the base station through a random access message in a random access process.

The terminal sends the capability information to the terminal through an RRC message.

In this way, signaling compatibility may be improved by sending the capability information through the random access message and/or the RRC message.

In one embodiment, the terminal may send the capability information to the base station in at least one of the following occasions.

In response to establishing the RRC connection, the capability information is sent to the base station using an RRC message.

In response to starting random access, the capability information is sent to the base station using a first message MSG1.

In response to receiving request information for acquiring capability information sent by the base station, the capability information is sent to the base station.

In one embodiment, in response to the terminal being capable of performing beam splitting, it is indicated that the terminal supports the capability of beam splitting. In response to the terminal being unable to perform beam splitting, it is indicated that the terminal does not support the capability of beam splitting.

In one embodiment, the information field of the capability information may indicate the beam splitting capability of the terminal. For example, in response to the information field of the capability information carrying "0", it indicates that the terminal does not support the beam splitting capability; in response to the information field of the capability information carrying "1", it indicates that the terminal does not support the beam splitting capability.

In one embodiment, the capability information includes at least one of the following.

First information indicates a capability of the terminal to support or not support beam splitting.

Second information indicates a spectral bandwidth of an effective beam formed by beam splitting. A difference between a gain of the effective beam and a gain of a center beam is less than or equal to a gain threshold. The center beam is a beam corresponding to a center frequency point of beam splitting.

Third information indicates the number of the effective beams.

Fourth information indicates a frequency-domain positional relationship between the effective beam and the center beam.

It is noted that those skilled in the art may understand that the methods provided in embodiments of the present disclosure may be executed independently, or together with some methods in embodiments of the present disclosure or some methods in the related art.

Figure 14:
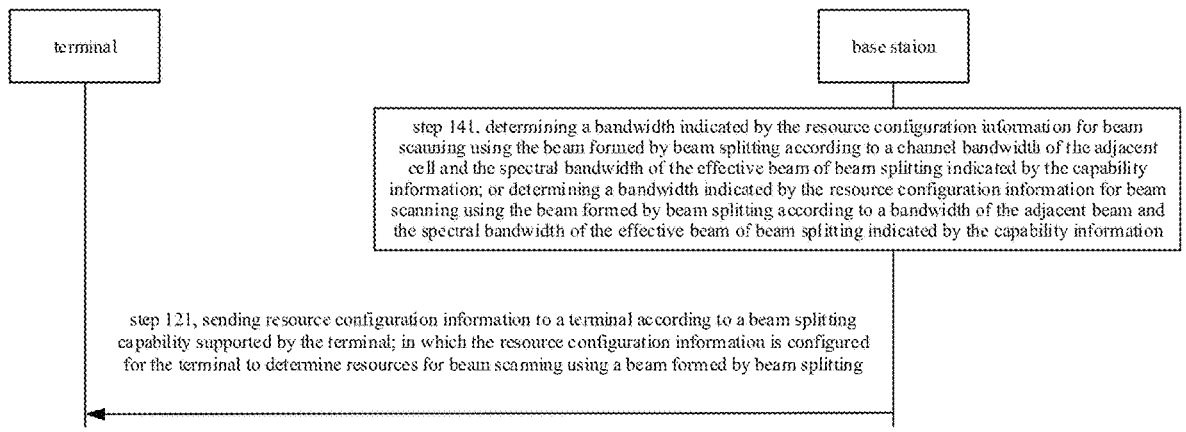
FIG. 14 is a flowchart illustrating a beam scanning method according to an illustrative embodiment.

As shown in FIG. 14, embodiments of the present disclosure provide a beam scanning method, which is performed by a base station, and the method includes:

step 141, determining a bandwidth indicated by the resource configuration information for beam scanning using the beam formed by beam splitting according to a channel bandwidth of the neighboring cell and the spectral bandwidth of the effective beam formed by beam splitting indicated by the capability information; or determining a bandwidth indicated by the resource configuration information for beam scanning using the beam formed by beam splitting according to a bandwidth of the neighboring beam and the spectral bandwidth of the effective beam formed by beam splitting indicated by the capability information.

In one embodiment, the neighboring cell is a cell adjacent to the serving cell.

In one embodiment, the channel bandwidth of the neighboring cell is different from the spectrum bandwidth of the effective beam formed by beam splitting indicated by the capability information. In one embodiment, the channel bandwidth of the neighboring cell is greater than the spectral bandwidth of the effective beam formed by beam splitting indicated by the capability information. In another embodiment, the channel bandwidth of the neighboring cell is smaller than the spectral bandwidth of the effective beam formed by beam splitting indicated by the capability information.

In one embodiment, the neighboring beam is a beam adjacent to the serving beam for data transmission between the terminal and the base station. The serving beam for data transmission between the terminal and the base station and the neighboring beam are both transmitted by the same base station.

In one embodiment, the bandwidth of the neighboring beam is different from the spectral bandwidth of the effective beam formed by beam splitting indicated by the capability information. In one embodiment, the bandwidth of the neighboring beam is greater than the spectral bandwidth of the effective beam formed by beam splitting indicated by the capability information. In another embodiment, the bandwidth of the neighboring beam is smaller than the spectral bandwidth of the effective beam formed by beam splitting indicated by the capability information.

In one embodiment, in response to the number of beams formed by beam splitting being greater than a number threshold, the spectral bandwidth of the effective beams formed by beam splitting indicated by the capability information is greater than the bandwidth threshold. In response to the number of beams formed by beam splitting being less than the number threshold, the spectral bandwidth of the effective beams formed by beam splitting indicated by the capability information is less than the bandwidth threshold.

It is noted that those skilled in the art may understand that the methods provided in embodiments of the present disclosure may be executed independently, or together with some methods in embodiments of the present disclosure or some methods in the related art.

Figure 15:
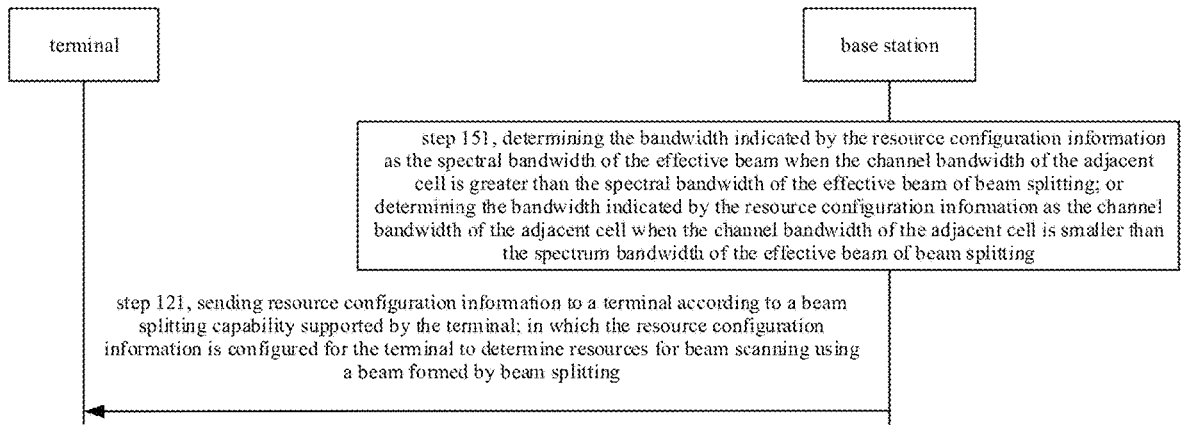
FIG. 15 is a flowchart illustrating a beam scanning method according to an illustrative embodiment.

As shown in FIG. 15, embodiments of the present disclosure provide a beam scanning method, which is performed by a base station, and the method includes:

step 151, determining the bandwidth indicated by the resource configuration information as the spectral bandwidth of the effective beam when the channel bandwidth of the neighboring cell is greater than the spectral bandwidth of the effective beam formed by beam splitting; or determining the bandwidth indicated by the resource configuration information as the channel bandwidth of the neighboring cell when the channel bandwidth of the neighboring cell is smaller than the spectrum bandwidth of the effective beam formed by beam splitting.

In one embodiment, in response to the channel bandwidth of the neighboring cell being greater than the spectral bandwidth of the effective beam formed by beam splitting, it is determined that the bandwidth indicated by the resource configuration information is the spectral bandwidth of the effective beam, so that the bandwidth indicated by the resource configuration information may be adapted to the spectrum bandwidth of the effective beam.

In one embodiment, in response to the channel bandwidth of the neighboring cell being smaller than the spectral bandwidth of the effective beam formed by beam splitting, it is determined that the bandwidth indicated by the resource configuration information is the channel bandwidth of the neighboring cell, so that the bandwidth indicated by the resource configuration information can be adapted to the channel bandwidth of the neighboring cell.

It is noted that those skilled in the art may understand that the methods provided in embodiments of the present disclosure may be executed independently, or together with some methods in embodiments of the present disclosure or some methods in the related art.

Figure 16:
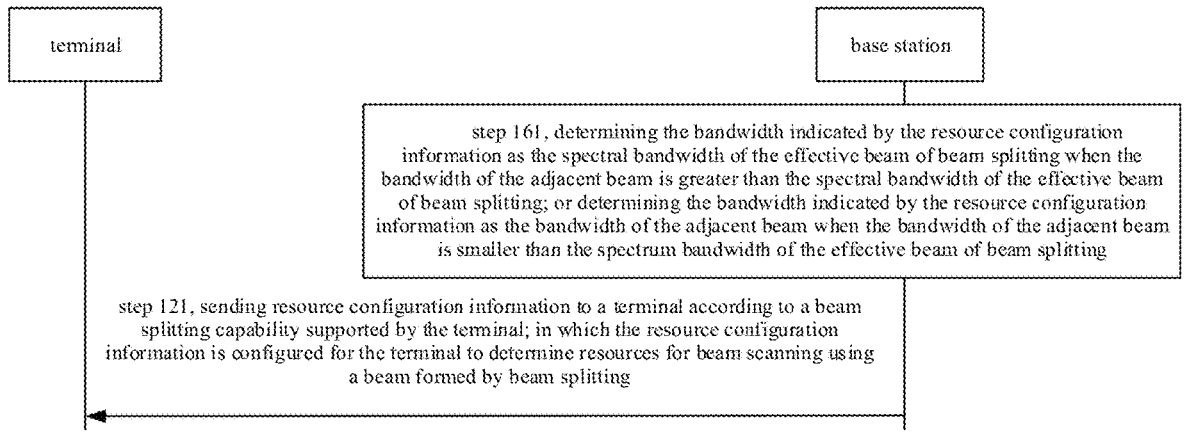
FIG. 16 is a flowchart illustrating a beam scanning method according to an illustrative embodiment.

As shown in FIG. 16, embodiments of the present disclosure provide a beam scanning method, which is performed by a base station, and the method includes:

step 161, determining the bandwidth indicated by the resource configuration information as the spectral bandwidth of the effective beam formed by beam splitting when the bandwidth of the neighboring beam is greater than the spectral bandwidth of the effective beam formed by beam splitting; or determining the bandwidth indicated by the resource configuration information as the bandwidth of the neighboring beam when the bandwidth of the neighboring beam is smaller than the spectrum bandwidth of the effective beam formed by beam splitting.

In one embodiment, in response to the bandwidth of the neighboring beam being greater than the spectral bandwidth of the effective beam formed by beam splitting, it is determined that the bandwidth indicated by the resource configuration information is the spectral bandwidth of the effective beam formed by beam splitting, so that the bandwidth indicated by the resource configuration information may be adapted to the spectral bandwidth of the effective beam formed by beam splitting.

In one embodiment, in response to the bandwidth of the neighboring beam being smaller than the spectral bandwidth occupied by the effective beam formed by beam splitting, it is determined that the bandwidth indicated by the resource configuration information is the bandwidth of the neighboring beam, so that the bandwidth indicated by the resource configuration information may be adapted to the bandwidth of the neighboring beam.

It is noted that those skilled in the art may understand that the methods provided in embodiments of the present disclosure may be executed independently, or together with some methods in embodiments of the present disclosure or some methods in the related art.

In order to further understand embodiments of the present disclosure, a beam scanning method is further illustrated below by an example.

Example 1

Figure 17:
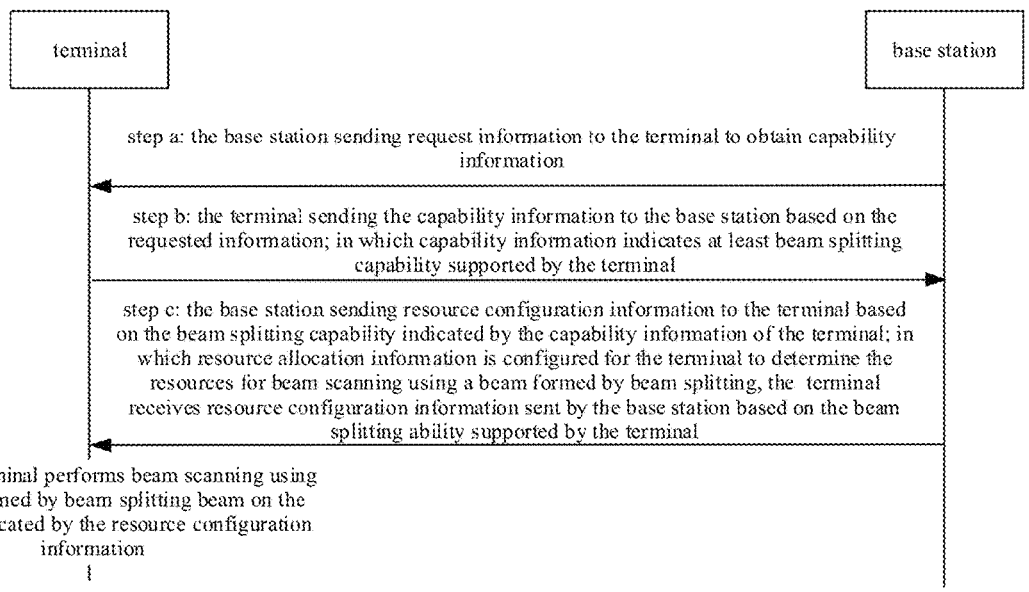
FIG. 17 is a flowchart illustrating a beam scanning method according to an illustrative embodiment.

Referring to FIG. 17, the example provides a beam scanning method, including steps as follows:

In step a, a base station sends request information for acquiring capability information to a terminal.

In step b, the terminal sends capability information to the base station according to the request information; in which the capability information at least indicates the beam splitting capability supported by the terminal.

In step c, the base station sends resource configuration information to the terminal according to the beam splitting capability supported by the terminal indicated by the capability information; in which the resource configuration information is configured for the terminal to determine resources for beam scanning using the beam formed by beam splitting. The terminal receives the resource configuration information that is sent by the base station according to the beam splitting capability of the terminal.

In step d, the terminal performs beam scanning using the beam formed by beam splitting on the resource indicated by the resource configuration information.

It is noted that those skilled in the art may understand that the methods provided in embodiments of the present disclosure may be executed independently, or together with some methods in embodiments of the present disclosure or some methods in the related art.

Figure 18:
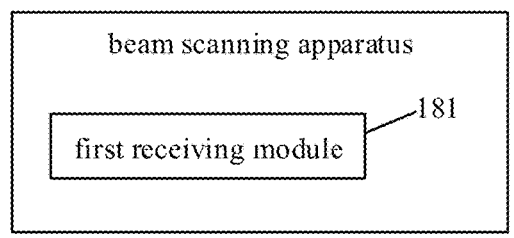
FIG. 18 is a schematic diagram illustrating a beam scanning apparatus according to an illustrative embodiment.

As shown in FIG. 18, embodiments of the present disclosure provides a beam scanning apparatus, which is performed by a terminal, and the apparatus includes a first receiving module 181.

The first receiving module 181 is configured to receive resource configuration information that is sent by a base station according to a beam splitting capability supported by the terminal.

The resource configuration information is configured for the terminal to determine resources for beam scanning using a beam formed by beam splitting.

It is noted that those skilled in the art may understand that the methods provided in embodiments of the present disclosure may be executed independently, or together with some methods in embodiments of the present disclosure or some methods in the related art.

Figure 19:
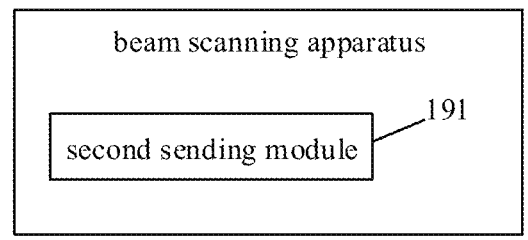
FIG. 19 is a schematic diagram illustrating a beam scanning apparatus according to an illustrative embodiment.

As shown in FIG. 19, embodiments of the present disclosure provides a beam scanning apparatus, which is performed by a base station, and the apparatus includes a second sending module 191.

The second sending module 191 is configured to send resource configuration information to a terminal according to a beam splitting capability supported by the terminal.

The resource configuration information is configured for the terminal to determine resources for beam scanning using a beam formed by beam splitting.

It is noted that those skilled in the art may understand that the methods provided in embodiments of the present disclosure may be executed independently, or together with some methods in embodiments of the present disclosure or some methods in the related art.

Regarding the apparatus in the above-mentioned embodiments, the specific manner in which each module executes operations has been described in detail in the embodiments related to the method, and will not be described in detail here.

Embodiments of the present disclosure provides a communication device, and the communication device includes:
a processor; and
a memory for storing instructions executable by the processor.

The processor is configured to implement the method according to any one of embodiments of the present disclosure.

The processor may include various types of storage media, which are non-transitory computer storage media, and may continue to memorize and store information thereon after the communication device is powered off.

The processor may be connected to the memory through a bus or the like, and is used to read the executable program stored in the memory.

Embodiments of the present disclosure provides a computer storage medium, which has stored therein instructions that, when executed by a processor, implement the method according to any one of embodiments of the present disclosure.

Regarding the apparatus in the above-mentioned embodiments, the specific manner in which each module executes operations has been described in detail in embodiments related to the method, and will not be described in detail here.

Figure 20:
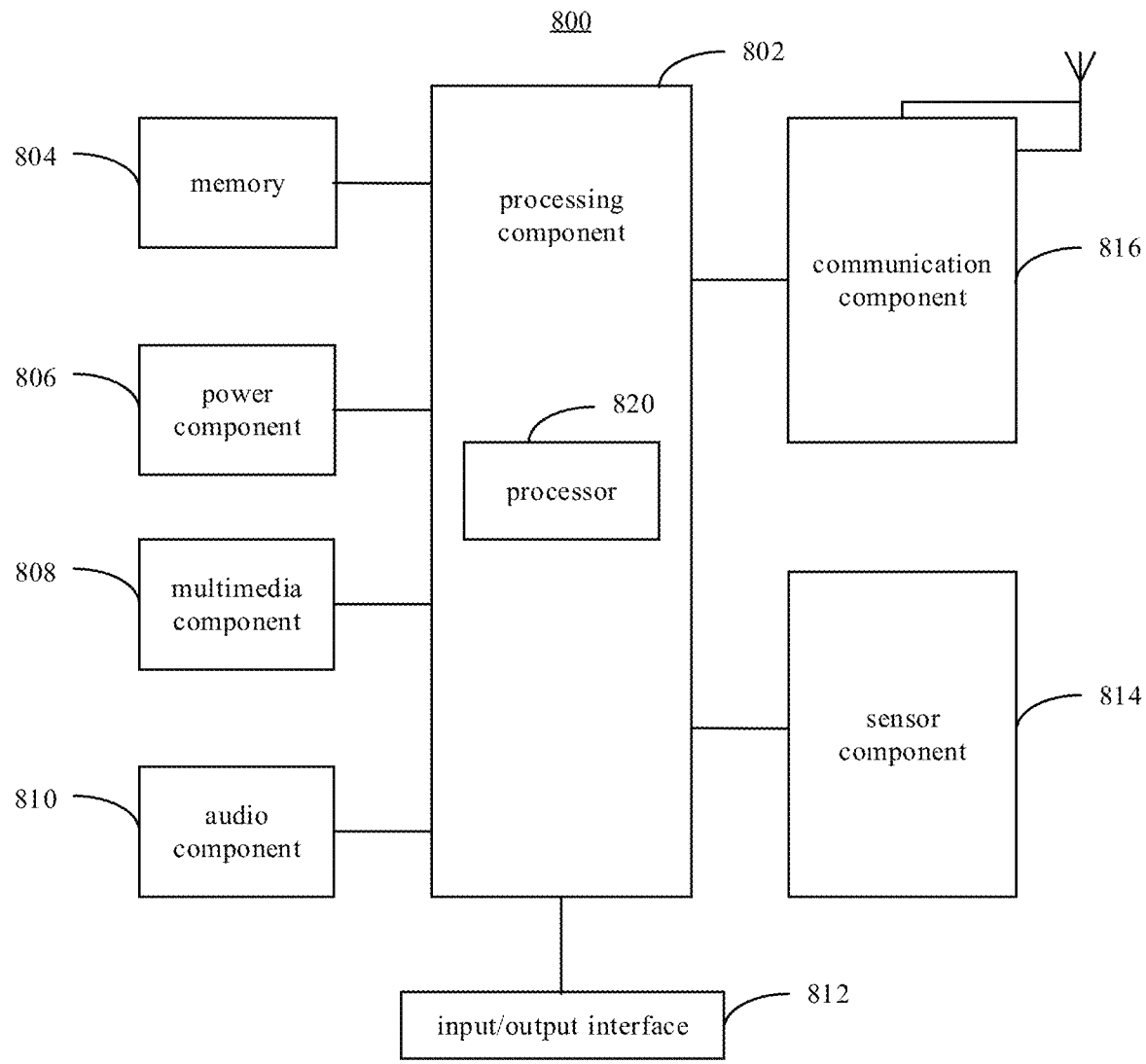
FIG. 20 is a schematic diagram illustrating a terminal according to an illustrative embodiment.

As shown in FIG. 20, embodiments of the present disclosure provides a terminal.

Referring to the terminal 800 shown in FIG. 20, embodiments of the present disclosure provide a terminal 800, which may be a mobile phone, a computer, a digital broadcast terminal, a messaging device, a game console, a tablet device, a medical device, a fitness device, a personal digital assistant, or the like.

As shown in FIG. 20, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the terminal 800, such as the operations associated with display, telephone calls, data communications, camera operations, and recording operations. The processing component 802 may include one or more processors 820 to execute instructions to complete all or part of the steps in the above-described method. Additionally, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense awake time and a pressure associated with the touch or swipe action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wireless, between the terminal 800 and other devices. The terminal 800 can access a wireless network based on a communication standard, such as WiFi, 2G, 3G, or a combination thereof. In one illustrative embodiment, the communication component 816 receives a broadcast signal or broadcast associated information from an external broadcast management system via a broadcast channel. In one illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described method.

In illustrative embodiments, there is also provided a non-transitory computer-readable storage medium including instructions, such as included in the memory 804, executable by the processor 1220 in the terminal 800, for performing the above-described method. For example, the non-transitory computer-readable storage medium may be a ROM, a RAM, a CD-ROM, a magnetic tape, a floppy disc, an optical data storage device, and the like.

Figure 21:
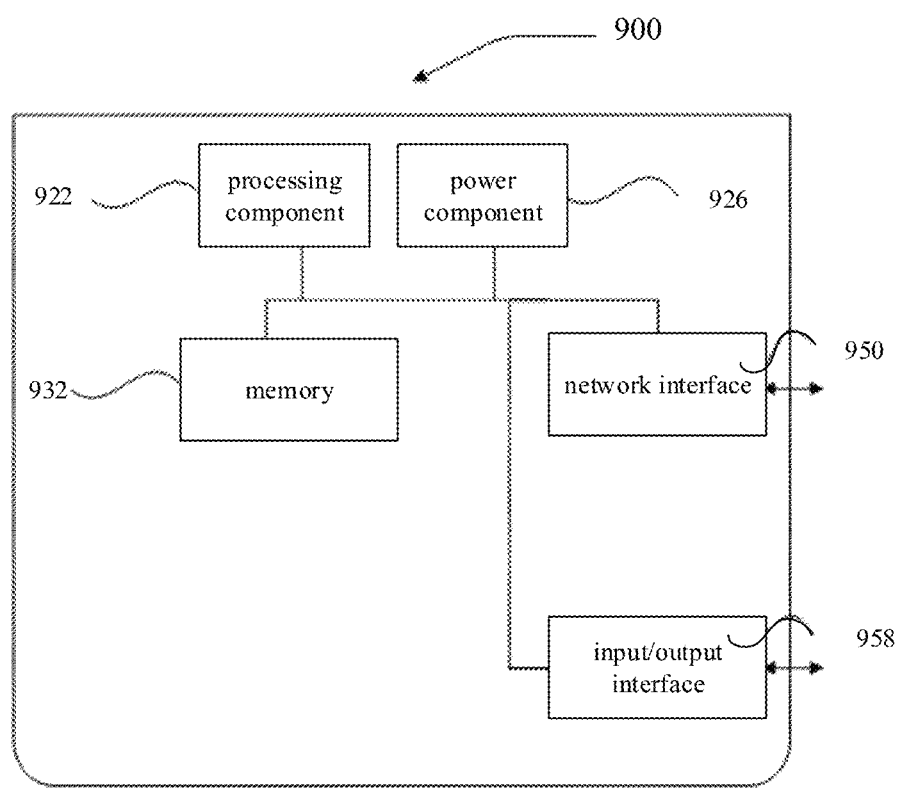
FIG. 21 is a block diagram illustrating a base station according to an illustrative embodiment.

FIG. 21 is a schematic diagram illustrating a base station according to an embodiment of the present disclosure. For example, the base station 900 may be a network device. Referring to FIG. 21, the base station 900 includes a processing component 922 that further includes one or more processors, and a memory resource represented by a memory 932 for storing instructions that may be executed by the processing component 922 such as application programs. The application program stored in the memory 932 may include one or more modules each corresponding to a set of instructions. In addition, the processing component 922 is configured to execute instructions to perform the above-mentioned methods performed by the base station.

The base station 900 may also include a power component 926 configured to perform power management of the base station 900, a wired or wireless network interface 950 configured to connect the base station 900 to a network, and an input/output (I/O) interface 958. The base station 900 can operate based on an operating system stored in the memory 932, such as Windows Server™, Mac OS X™, Unix™, Linux™, FreeBSD™ or the like.

Other embodiments of the present disclosure will be apparent to those skilled in the art from consideration of the specification and practice of the disclosure disclosed here. The present disclosure is intended to cover any variations, uses, or adaptations of the disclosure following the general principles thereof and including such departures from the disclosure as come within known or customary practice in the art. It is intended that the specification and examples be considered as exemplary only, and the scope and spirit of the present disclosure are indicated by the attached claims.

It will be appreciated that the present disclosure is not limited to the exact construction that has been described above and illustrated in the accompanying drawings, and that various modifications and changes can be made without departing from the scope thereof. The scope of the present disclosure is limited only by the attached claims.

What is claimed is:

1. A beam scanning method, performed by a terminal and comprising:
    sending capability information to a base station, wherein the capability information indicates a beam splitting capability supported by the terminal;
    receiving resource configuration information that is sent by the base station according to the beam splitting capability supported by the terminal;
    wherein the resource configuration information is configured for the terminal to determine resources for beam scanning using a beam formed by beam splitting;
    wherein the capability information comprises at least one of:
    first information indicating a capability of the terminal to support or not support beam splitting;
    second information indicating a spectral bandwidth of an effective beam formed by beam splitting; wherein a difference between a gain of the effective beam and a gain of a center beam is less than or equal to a gain threshold; the center beam is a beam corresponding to a center frequency point of beam splitting;
    third information indicating the number of the effective beams; or
    fourth information indicating a frequency-domain positional relationship between the effective beam and the center beam.

2. The method according to claim 1, wherein the resource configuration information is configured for the terminal to determine resources for beam scanning in a neighbor cell using the beam formed by beam splitting; the neighbor cell is a cell adjacent to a serving cell; or
    the resource configuration information is configured for the terminal to determine resources for beam scanning in a neighbor beam using the beam formed by beam splitting; the neighbor beam is a beam adjacent to a serving beam.

3. The method according to claim 1, wherein the method further comprises:
    performing beam scanning by using the beam formed by beam splitting on resources indicated by the resource configuration information.

4. The method according to claim 3, wherein performing beam scanning by using the beam formed by beam splitting on the resources indicated by the resource configuration information comprises:
    performing beam scanning within a predetermined scanning angle by using the beam formed by beam splitting on the resources indicated by the resource configuration information.

5. The method according to claim 3, wherein the method further comprises:
    starting a beam splitting mode when the terminal needs to perform beam scanning and the terminal not enabling the beam splitting mode for performing beam splitting.

6. The method according to claim 5, wherein the method further comprises:
    closing the beam splitting mode in response to an end of the beam scanning of the terminal.

7. The method according to claim 5, wherein the method further comprises:
    sending a signal quality of a sounding signal scanned on the beam formed by beam splitting to the base station in response to an end of the beam scanning of the terminal.

8. The method according to claim 7, wherein the method further comprises:
adjusting the signal quality of the sounding signal scanned on the beam formed by beam splitting by using a gain difference between the beam formed by beam splitting and a center beam;
wherein the center beam is a beam corresponding to a center frequency point of beam splitting.

9. A beam scanning method, performed by a base station and comprising:
receiving capability information sent by a terminal, wherein the capability information at least indicates a beam splitting capability supported by the terminal;
sending resource configuration information to the terminal according to the beam splitting capability supported by the terminal;
wherein the resource configuration information is configured for the terminal to determine resources for beam scanning using a beam formed by beam splitting;
wherein the capability information comprises at least one of:
first information indicating a capability of the terminal to support or not support beam splitting;
second information indicating a spectral bandwidth of an effective beam formed by beam splitting; wherein a difference between a gain of the effective beam and a gain of a center beam is less than or equal to a gain threshold; the center beam is a beam corresponding to a center frequency point of beam splitting;
third information indicating the number of the effective beams; or
fourth information indicating a frequency-domain positional relationship between the effective beam and the center beam.

10. The method according to claim 9, wherein
the resource configuration information is configured for the terminal to determine resources for beam scanning in a neighbor cell using the beam formed by beam splitting; wherein the neighbor cell is a cell adjacent to a serving cell; or
the resource configuration information is configured for the terminal to determine resources for beam scanning in a neighbor beam using the beam formed by beam splitting; wherein the neighbor beam is a beam adjacent to a serving beam.

11. The method according to claim 9, wherein the method further comprises:
determining a bandwidth indicated by the resource configuration information for beam scanning using the beam formed by beam splitting according to a channel bandwidth of the neighbor cell and the spectral bandwidth of the effective beam formed by beam splitting indicated by the capability information; or
determining a bandwidth indicated by the resource configuration information for beam scanning using the beam formed by beam splitting according to a bandwidth of the neighbor beam and the spectral bandwidth of the effective beam formed by beam splitting indicated by the capability information.

12. The method according to claim 11, wherein determining the bandwidth indicated by the resource configuration information for beam scanning using the beam formed by beam splitting according to the channel bandwidth of the neighbor cell and the spectral bandwidth of the effective beam formed by beam splitting indicated by the capability information comprises:
determining the bandwidth indicated by the resource configuration information as the spectral bandwidth of the effective beam in response to the channel bandwidth of the neighbor cell being greater than the spectral bandwidth of the effective beam formed by beam splitting; or
determining the bandwidth indicated by the resource configuration information as the channel bandwidth of the neighbor cell when the channel bandwidth of the neighbor cell is smaller than the spectrum bandwidth of the effective beam formed by beam splitting.

13. The method according to claim 11, wherein determining the bandwidth indicated by the resource configuration information for beam scanning using the beam formed by beam splitting according to the bandwidth of the neighbor beam and the spectral bandwidth of the effective beam formed by beam splitting indicated by the capability information comprises:
determining the bandwidth indicated by the resource configuration information as the spectral bandwidth of the effective beam formed by beam splitting when the bandwidth of the neighbor beam is greater than the spectral bandwidth of the effective beam formed by beam splitting; or
determining the bandwidth indicated by the resource configuration information as the bandwidth of the neighbor beam when the bandwidth of the neighbor beam is smaller than the spectrum bandwidth of the effective beam formed by beam splitting.

14. A communication device, comprising:
an antenna;
a memory;
a processor respectively connected to the antenna and the memory, and configured to execute computer-executable instructions stored in the memory to:
send capability information to a base station, wherein the capability information indicates a beam splitting capability supported by a terminal;
control sending and receiving of the antenna and receive resource configuration information that is sent by the base station according to the beam splitting capability supported by the terminal;
wherein the resource configuration information is configured for the terminal to determine resources for beam scanning using a beam formed by beam splitting;
wherein the capability information comprises at least one of:
first information indicating a capability of the terminal to support or not support beam splitting;
second information indicating a spectral bandwidth of an effective beam formed by beam splitting; wherein a difference between a gain of the effective beam and a gain of a center beam is less than or equal to a gain threshold; the center beam is a beam corresponding to a center frequency point of beam splitting;
third information indicating the number of the effective beams; or
fourth information indicating a frequency-domain positional relationship between the effective beam and the center beam.

15. The communication device according to claim 14, wherein the resource configuration information is configured for the terminal to determine resources for beam scanning in a neighbor cell using the beam formed by beam splitting; the neighbor cell is a cell adjacent to a serving cell; or the resource configuration information is configured for the terminal to determine resources for beam scanning in a neighbor beam using the beam formed by beam splitting; the neighbor beam is a beam adjacent to a serving beam.

* * * * *